United States Patent [19]
Wavish

[11] Patent Number: 6,032,142
[45] Date of Patent: Feb. 29, 2000

[54] AUTONOMOUS COMPOUND AGENTS

[75] Inventor: Peter R. Wavish, West Hoathly, United Kingdom

[73] Assignee: U.S. Philips Corporation, New York, N.Y.

[21] Appl. No.: 08/957,993

[22] Filed: Nov. 5, 1997

[30] Foreign Application Priority Data

Nov. 8, 1996 [GB] United Kingdom .................... 9623336

[51] Int. Cl.[7] .................................................. G06F 17/00
[52] U.S. Cl. .................................. 706/47; 706/46; 706/50
[58] Field of Search .................................. 706/46, 47, 50

[56] References Cited

U.S. PATENT DOCUMENTS

| 5,214,715 | 5/1993 | Carpenter et al. | 382/157 |
| 5,325,031 | 6/1994 | Tilden | 318/568.16 |

OTHER PUBLICATIONS

"A Bottom–Up Mechnism for Behaviour Selection in an Artificial Creature" by P. Maes, Proc 1st Int Conf on the simulation of Adaptive Behaviour, eds Meyer and Wilson, MIT Press 1991.

"A Situated Action Approach to Implementing Characters in Computer Games" by P R Wavish and M. Graham, Applied AI Journal, vol. 10, No. 1, Jan/Feb 1996 pp 1–14 .

"Roles, Skills and Behaviour: A Situated Action Approach to Organising Systems of Interacting Agents: by P R Wavish and M Graham, in Intellgent Agent" Eds Michael J Wooldrige & Nicholas R Jennings, Lecture Notes in Artificial Intelligence 890 , Spring–Verlag 1995.

"The Society of Mind " by M Minsky; pp81–92, Simon & Schuster 1986.

"Appeal : A Multi–Agent Approach to Interactive Learning Environment" by J F M Masthoff and R R G vanHoe, Proc MAAMAW '94, Odense, Denmark 2–6 Aug. pp1–12.

"Situated Agents Can Have Goals " by Pattie Maes, Bradford MIT Press, 1995, Elsevier Science Publishers B.V. (North–Holland).

"Modeling belief and action in a multi–agent system"; Novick, D.G.; AI, Simulation and Planning in High Autonomy Systems, 1990., Proceedings. , 1990, pp.: 34–41.

"Improv: A System for Scripting Interactive Actors in Virtual Worlds"; K. Perlin and A. Goldberg; In Computer Graphics (SIGGRAPH'96 Proceedings), pp. 205–216, Aug. 1996.

*Primary Examiner*—Tariq R. Hafiz
*Assistant Examiner*—Edward G. Brown
*Attorney, Agent, or Firm*—Gregory L. Thorne

[57] ABSTRACT

In a rule-based processor, populations of component agents are enabled to self-assemble into compound agents such as to give a degree of distributed artificial intelligence in a relatively simple system. The majority of component agents have top and bottom decision structures into which requesting agents can insert rules: the rule selected by a decision structure is the one which is valid following evaluation of a priority criteria and leads to the placing of a marker from the selecting agent to the requesting agent. With the two decision structures, behaviour trees may be formed from the top down or the bottom up, as required by the instantaneous situation to which the compound agent is responding.

8 Claims, 3 Drawing Sheets

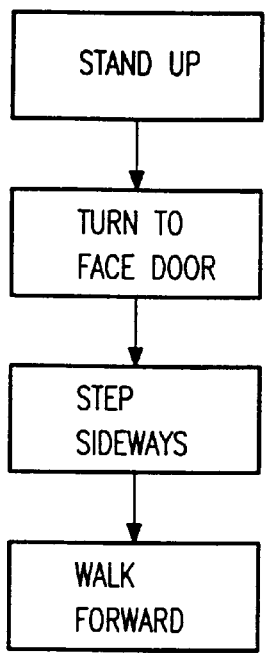
FIG. 2
| AGENT | BEHAVIOUR | WAITING FOR |
|-------|-----------|-------------|
| 1 | GETTING OUT (Room) | 2 |
| 2 | GOING TO (Door) | 3+4 |
| 3 | WALKING | 5 |
| 4 | FACING TOWARDS (Door) | 5 |
| 5 | STANDING UP | |
FIG. 3
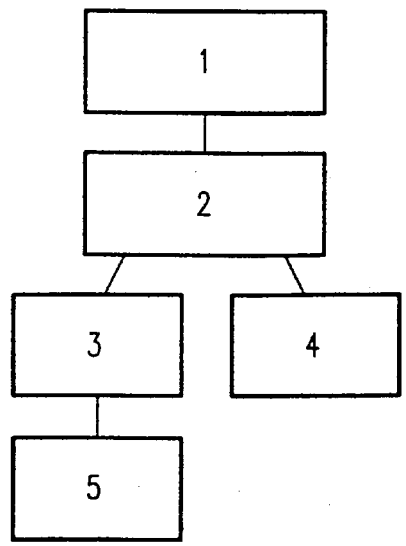
FIG. 4

| BEHAVIOUR | AGENT STATE |
|---|---|
| Getting out (Room) | Beginning |
| Going to (Door) | Beginning |
| Walking | Beginning |
| Facing towards (Door) | Beginning |
| Standing up | Doing |

FIG. 5

| BEHAVIOUR | AGENT STATE |
|---|---|
| Getting out (Room) | Doing |
| Going to (Door) | Doing |
| Walking | Doing |
| Facing towards (Door) | Doing |
| Standing up | Ending |

FIG. 6

| BEHAVIOUR | AGENT STATE |
|---|---|
| Getting out (Room) | Doing |
| Going to (Door) | Doing |
| Walking | Failing |
| Facing | Doing |
| Avoiding (Chair) | Doing |
| Side stepping | Beginning |
| Standing up | Resting |

FIG. 7

AUTONOMOUS COMPOUND AGENTS

BACKGROUND OF THE INVENTION

The present invention relates to rule-based data processing apparatuses and in particular to the generation of compound agents and the provision of mechanisms for interaction between such compound agents.

The construction and operation of both simple and complex groupings of rule-based software agents and data processing systems supporting them will be understood by those of ordinary skill in the art. Further description of various features and functions of agent-based systems, particularly (but not limited to) those supporting the real-time agent behaviour language RTA may be found in the following commonly-assigned published cases: European patent EP-B-0,397,259 U.S. Pat. No. 5,418,887 and European (PCT) patent applications EP-A-0,704,077 (IB95/00192), EP-A-0,722,592 (IB95/00515) and EP-A-0,724,751 (IB95/00516).

The general idea of constructing a complex agent (hereinafter a compound agent) from a large number of relatively simpler similar agents (hereinafter component agents) is analogous to the arrangement of "knowledge trees" as put forward by Marvin Minsky in "The Society of Mind", published by William Heinemann, 1987, ISBN 0 434 46758 8. Each of the ideas or concepts (which Minsky also refers to as "agents") at the various hierarchical levels of the tree is joined to agents in the levels above or below by Knowledge- or K-lines. In two papers by P. R. Wavish and M. Graham ("A Situated Action Approach to Implementing Characters in Computer Games", Applied AI Journal, Vol. 10, no. 1, Jan/Feb 1996; and "Roles, Skills and Behaviour: a Situated Action Approach to Organising Systems of Interacting Agents", in "Intelligent Agents", edited by M. J. Wooldridge and N. R. Jennings, Lecture Notes in Artificial Intelligence 890, Springer-Verlag, 1995) there is described a way of constructing compound agents by designing organisations in terms of roles, and then implementing compound agents capable of performing the roles. The roles and skills of the compound agent are coded as autonomous agents, but these generally have little interaction with each other, and the compound agents have no planning capability.

The standard artificial intelligence approach to action generation is to plan a sequence of actions (or more generally, a graph of possible actions at some level of abstraction) and then to execute this sequence or graph. This approach has various problems associated with it. Firstly, the agent needs to maintain an internal model of its environment; searching for a valid plan is computationally expensive with that plan being based on a model of the agent's environment which is liable to be inaccurate and become out of date. Additionally, replanning is necessary when the plan fails because of some unanticipated contingency.

SUMMARY OF THE INVENTION

It is therefore an object of the present invention to provide a compound agent having greater freedom and flexibility of operation, which compound agent is not reliant on an internal environmental model.

In accordance with the present invention there is provided a rule-based data processing apparatus comprising a processor coupled with memory means having stored therein a first group of agents, said first group being defined by a respective set of rules, and each agent being configured to effect respective designated functions when triggered by a respective predetermined set of conditions holding true and at least some of said agents being configured to trigger others of said agents to effect their respective functions through markers linking respective pairs of agents; characterised in that each agent includes a first decision structure into which respective rules from others of said group of agents may be placed, each decision structure being arranged to periodically select and act on one of the rules placed therein in accordance with predetermined selection criteria, and each agent being configured to place a marker on an agent originating a rule selected by said agent, and to periodically identify one or more other agents of the said group as capable of effecting at least a part of that agents designated function and to place a rule into the first decision structure of the or each agent so identified.

With markers being placed as required, role and skill agents are capable of self-assembling into tree structures through use of the decision structures (described hereinafter), and this provides compound agents with a kind of planning capability. Each of the component agents may include a second decision structure and be further configured to periodically identify one or more other agents of the said group (the compound agent) as having the agents designated function as at least a part of their designated function and to initiate the placing of a rule into the second decision structure of the or each such identified agent. Consequently, the tree structures can also self-assemble from the bottom up, with those agents carrying out basic functions linking themselves to those agents having the skill to direct those functions.

Each rule placed in a decision structure suitably has an associated priority value, and the periodic selection by the decision structure could then be of the highest priority from amongst the rules currently placed. In such an implementation, each priority value may be a time delay, with each decision structure being arranged to periodically synchronously trigger all time delays of rules placed therein, the first rule for which the associated delay expires whilst the condition portion of that rule is satisfied becoming the selected rule. Such a system of arbitration in the decision structures would enable an agent to select from amongst those seeking to establish a marker, whilst ensuring that only active agents are considered.

In more complex arrangements, a further group of agents (compound agent) may be stored within the memory means and be defined by a respective set of rules, with at least some of the component agents of that compound agent having first and second decision structures, and at least some component agents of each compound agent being operable to place rules within decision structures of selected agents within the other compound agent. In other words, individual component agents are each capable of skilled interaction with their environment, which includes component agents within other compound agents that are playing complementary roles. In order to provide representation for other features of the environment, a plurality of further agents may be stored within the memory means and defined by respective rules, with each of these further agents having only a first decision structure.

With the present invention, there is no internal model and consequently there is no planning or replanning: the actions generated are appropriate to the current situation because they are based on the compound agent's current perception of the environment rather than on an internal model.

Further features and advantages of the present invention are recited hereinafter and in the attached claims, to which reference should now be made.

BRIEF DESCRIPTION OF THE DRAWINGS

The present invention will now be described, with particular reference to virtual actors governed by a society of agents by way of example only, with reference to the accompanying drawings, in which:

FIG. 2 represents a conventional artificial intelligence approach to solving an example problem;

FIG. 3 is a table of agent behaviour states during application of the present invention to the situation of FIG. 2;

FIG. 4 represents agents from the table of FIG. 3 assembled in a tree structure of a compound agent;

FIG. 5 is a modified version of the table of agent states of FIG. 3; and

FIGS. 6 and 7 represent subsequent contents of the table of FIG. 5 resulting from the actions of a compound agent.

DESCRIPTION OF THE PREFERRED EMBODIMENTS

Figure 1:
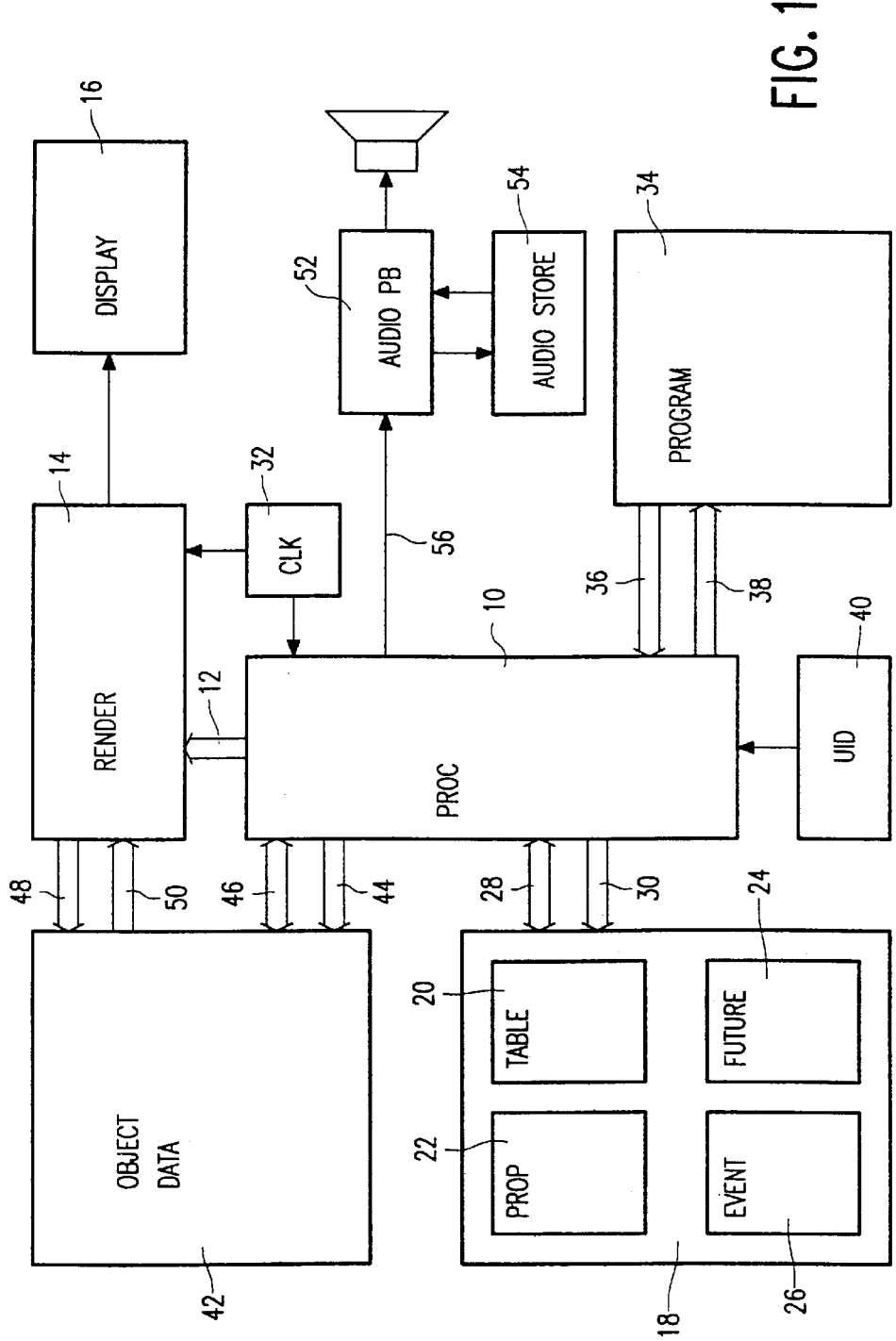
FIG. 1 is a block schematic diagram of a rule-based data processing apparatus embodying the present invention.

Virtual actors in virtual worlds, such as characters in computer games, need to be able to act "intelligently" in order to cope with other actors and objects in the world and in order to appear believable as intelligent entities to human users, viewers or game players. As previously mentioned, the standard approach to building reasoning and control mechanisms for such actors is to have at least two modules coupled together: an artificial intelligence (AI) planner that can reason about the situation slowly, and a reactive module that can react quickly but unintelligently. The approach followed here however is to provide a single society of much simpler agents (hereinafter referred to as a compound agent comprised of a plurality of component agents) which collectively can react quickly and intelligently to the current situation.

FIG. 1 shows an interactive entertainment apparatus based around a rule-based data processing apparatus embodying the present invention. The apparatus comprises a processor 10 operating on a compiled asynchronous logic circuit representation defined by a population of RTA rules. Through control and data link 12, the processor 10 is enabled to control a multi-character interactive animation for which scenes are generated by image rendering stage 14 and output to display 16. The processor 10 has associated with it a number of data stores, a first of which is random access memory (RAM) 18 which provides discrete storage areas for a table 20 of the various elements of the asynchronous logic circuit representation of the compiled population of RTA rules, and listings of propagate functions 22, future element state changes 24, and an event stack 26. These features perform their conventional functions, a more detailed description of which is given in the above-mentioned European patent application EP-A-0,704,077.

The RAM 18 is connected to the processor 10 by a data bus 28 and an address bus 30 in known manner. Also in known manner, a clock (CLK) 32 is connected to the processor and, as shown, the rendering stage 14. A read-only memory (ROM) 34 is coupled to the processor 10 by a data bus 36 and address bus 38 and provides a program store holding a command structure governing implementation of the compiled circuit representation for each of the compound and component agents. A user interface device (UID) 40 is provided to enable input of control data and commands directly to the processor 10; the form of the UID will depend on what is required by the application, and may range from one or two simple buttons to keyboard/mouse input in conjunction with a graphical user interface on display 16 and generated by the rendering stage 14.

This form of a rule-based system embodying the present invention addresses the problem of how to create apparently intelligent virtual actors playing, for example, characters in a computer game. Data defining the layout and appearance of a virtual environment is held in a further RAM 42 together with data defining the appearance and current position within the virtual environment of various objects ("props" such as tables, chairs, books, etc.) and each of the virtual actors. The processor 10 has read/write access to the RAM 42 via address 44 and data 46 buses, whilst the rendering stage 14 has read-only access via respective address 48 and data 50 buses. Audio accompaniment to the images of the virtual environment may be provided by an audio playback stage 52 which accesses data from a respective audio data store 54 and is under the direction of the processor 10 through control line 56.

The script directing the virtual actors may be represented at run-time by a chain of autonomous script agents such that it plays an active part in the operation of the system, with the virtual actors being respective compound agents whose activity is partly determined by the situation in which they are embedded (and which their activity is helping to construct) and partly by the script which they enact. The control of the performance of the script is distributed amongst the virtual actors, each of which is responsible for identifying the parts of the script to be performed and for identifying the cue for performing them. The actions performed by the virtual actors are used additionally to update the data on their appearance held in RAM 42 such that the rendering stage 14 need only determine where to generate the updated representation in relation to the image of the virtual environment. To handle the function for intermediate objects, the theatrical "props" such as a door which may be open or closed or a book which may be passed from one character to another, a relatively simple class of agents is provided. These agents are independent of any particular compound agent and are referred to hereinafter as object agents.

In terms of software control of entities, intelligence is often thought of as the capacity to plan actions in order to solve problems. To take a very simple example, suppose that a virtual actor controlled by a compound agent is sitting on a chair with its back to the door, and is told to leave the room. The first problem is that it cannot immediately move to the door, because it is sitting down. The second problem is that when the virtual actor stands up, it cannot walk directly to the door, because it is facing in the wrong direction. A third problem is that even if it does turn in the right direction, it is unlikely to be able to walk forward because the chair is in the way.

The conventional AI approach to this is to plan a sequence of actions ahead of time. An AI planner would generate a plan, such as that shown in FIG. 2, and then proceed to execute the plan step by step. In mechanisms embodying the present invention, instead of the sequence of actions being generated ahead of time by an AI planner, the actions are determined as needed by the component agents within the compound agent. Each component agent controls a behaviour of the compound agent, such as standing up, turning, or walking. Some of these behaviours correspond to visible motion of the compound agent, while others are more abstract.

When faced with the previous problem of how to get out of a room from a seated start, the present approach differs from that outlined in FIG. 2, with the table of FIG. 3 listing the component agents which would be active concurrently at the point where the compound agent is rising to its feet, and FIG. 4 representing the instantaneous arrangement of these agents as a fraction of the compound agent tree structure.

The component agent 5 called "standing up" is currently performing the corresponding behaviour because the other component agents are blocked. As soon as the compound agent has risen to its feet, it will start turning towards the door and walking. At this point, if the chair is perceived as being in its path, another component agent which performs "avoiding" may be invoked which may in turn invoke "step sideways" until the path ahead is seen to be clear. Similarly when the compound agent reaches the door, an "opening" component agent might be invoked by the "getting out" component agent in order to turn the door handle and so leave the room.

When one component agent is waiting for another component agent to perform its behaviour, it continues to monitor the current situation. This situation is represented partly by the states of the other component agents in the virtual actor (compound agent), and partly by the states of other objects and other compound agents in the world (including component agents within the other compound agents). This allows the compound agent to respond immediately to changes in its situation. For instance the "getting out" component agent may determine that the status of a qualifier for the "door" object has been changed to "locked", and pass a new destination (the window, say) to the "going to" component agent which then passes it to the "facing towards" component agent. Then, when the standing up action is completed, the compound agent will turn to face the window rather than the door.

In a refinement of the system already described, each agent has a number of states, or modes:

resting
beginning
doing
ending
failing.

Each agent is in exactly one of these states at any time, with the most common state being resting. During the beginning state, the agent carries out preparatory activity, such as standing up before walking if it is currently sitting down. During the doing state, the agent is actually doing what its name implies, e.g walking. The ending state is entered when the task has been accomplished successfully, and the failing state is entered if the agent is unsuccessful. In the table of FIG. 5, corresponding to the example of FIG. 3, the first four agents are in the beginning state, with the fifth ("standing up") in the doing state making explicit that what the virtual actor is currently doing is standing up, although it also "intends" to leave the room, go to the door, etc.

Later on, when the virtual actor has stood up and turned to face the door and started walking, the states of the agents would be shown as in FIG. 6, with all the agents in the doing mode except for standing up which is ending. When the chair is encountered, the actor stops walking and the "going to" agent organises obstacle avoidance activity, with the agent states then as shown in FIG. 7.

In order to enable this functionality, a uniform interface is provided between component agents so that they can self-assemble into tree structures (such as the fragment of FIG. 4) containing active component agents that rely on, and support, each other's performance. These trees, which change with time, instantaneously determine what a compound agent does. Consequently, rather than being a sequence of actions generated ahead of time, the tree is a set of active component agents controlling what is to be done at different levels of abstraction or detail, and the actions of the compound agent are generated by this set of component agents as they are required. In the FIG. 4 example, the tree of active agents self-assembles from the top down. This is superficially similar to the procedure 'call tree' that exists when a conventional procedural programming language program is being executed, except that in the present case what exists is a tree of concurrently executing autonomous component agents whose overall activity can be continuously influenced by component agents anywhere within the tree rather than just by the component agent currently at the bottom of the tree.

These trees can also self-assemble from the bottom up, such as when one or more active roles or skills (component agents of specific function) invokes another skill which is capable of organising their interaction. For instance, if the compound agent happens to be walking towards a door, the "getting out" component agent may be activated in order to organise the behaviour of the compound agent through others of its component skills when it reaches the door; e.g. turning the handle if the door is closed.

A preferred embodiment of this scheme has the component agents corresponding to behaviours implemented as RTA modules communicating with each other through markers and constraints. Each module contains two decision structures, respectively identified herein as top and bottom. The top decision structure determines which agent has nominal "control" over the current task (in effect, which agent is to receive the report of the task performance), and access is distributed amongst the other component agent modules that are competing for assistance from this component agent. As will be described below, in some circumstances the functioning of the a component agent may generate data of value to several component agents, not just the linked one, and consequently other agents are enabled to make opportunistic use of data generated in this way. The bottom decision structure determines what actions the component agent performs, which may include the placing of markers through inserting licences into the top decision structure of other agents in order to get assistance, as well as control using basic behaviours of the compound agent such as walking, grasping or speaking. A component agent could also call for markers by inserting licences into the bottom decision structure of other component agents, for instance as part of the bottom-up self-assembly process described above.

As well as interacting with other component agents within the compound agent, component agents can interact (via markers) with other objects and compound agents in their environment. Thus each component agent may in itself display skilful behaviour with respect to other objects or compound agents. The markers on the objects of interest to the skill agents correspond to the parameters of the behaviours or the objects towards which the behaviours are directed (such as the door, in the case of the "going to" and "turning towards" component agents). The top decision structure of each component agent provides a way of deciding which object the activity of that component agent is directed towards when there are competing requests from other component agents for assistance.

In an extension of this system, some of the skill modules in an agent may be for performing roles, as described in the previously identified papers of Wavish and Graham. This allows agents to interact with each other fluently. For instance, the complementary skills associated with giving and receiving make it possible for one compound agent (the donor) to interact fluently with another (the recipient) in order to transfer an object from one to the other by direct contact between the donors "giving" component skill agent, and the recipients "receiving" skill agent.

A second useful extension of this system is where some of the skill agents are concerned with performing scripts, as briefly mentioned above in connection with the arrangement of FIG. 1. In such a case, individual skill agents might correspond to searching for the next action to perform, searching for the cue, and performing a scripted action. The skill module responsible for performing scripted actions would use the information in the script to activate the appropriate skill agents.

In a third extension, some of the skill agents are concerned with actions of the compound agent's body. For instance, in controlling a robot or a simulation of a human figure, the various joints in the skeleton may have skill modules associated with them. For instance, one could be associated with the eyeballs, and another with the neck joint. These agents would collaborate to satisfy the requirement to look at a particular object; if eyeball motion alone is insufficient, then neck motion is required.

A fourth extension is where, in addition to component agents corresponding to skills and roles, there are also agents corresponding to percepts such as the kind of object being looked at, its colour, its shape, or more abstract aspects of the situation in which the compound agent is embedded. These agents can also self-assemble into hierarchies in the way described. They act as a source of information about the situation that can be used by the skill and role agents to make their actions more appropriate to the context.

A fifth extension (generally in conjunction with the third) has one of the skill agents handling a "sense" of the virtual actor, such as controlling the direction of gaze of the compound agent: virtual actors need to be able to see objects in the (virtual) world around them not only to determine what to do, but also so that the animation of their direction of gaze looks realistic to the viewer.

In a virtual world, information about what a virtual actor sees while looking at a particular object can be determined directly from the current state of the object, as represented by a corresponding object agent, such that no image analysis or recognition is necessarily involved. The problem of making a virtual actor see reduces to that of controlling the direction of gaze to match that actor's current interests. For instance, an actor may need to see obstacles in its path as well as look at another actor that it is talking to. Within the compound agent, several component agents may require access to the information that is provided by the actor's eyes being fixated on a particular object in its environment. The actor's eyes (and other sources of sensory input) are thus a shared resource which may be required concurrently by different agents, and hence some form of arbitration is required between the requesting component agents.

A straightforward way of implementing this is a priority scheme whereby each component agent requests the use of the eyes and is granted its request if it has the highest priority. In a preferred implementation however, the request from a component agent is not for the use of the resource as such, but is a request to fixate the actor's eyes on a particular object.

Following resolution by the decision structure, the actor's eyes are then moved to the object indicated by the highest priority request. Instead of notifying the component agent issuing the request that it has succeeded, it is left to that component agent itself to determine whether the request has been satisfied and, if not, whether the resulting direction of gaze (as requested by another agent) provides a useful view. A simple way of doing this is to compare the current direction of gaze with the requested direction of gaze each time a change of direction (saccade) takes effect. An alternative is to compare the information retrieved from the respective agent of the object being looked at with the expected information. For instance, if a component agent has requested to see the other actor being spoken to, and what is actually seen appears to be a table, the request has obviously failed.

In an embodiment of this in RTA, the prioritising of requests is done by a decision structure as described above, and an individual request is made by activating a particular licence within that decision structure. The movement of the actor's eyes is done by an identify behaviour which places the "the-object-I-am-looking-at" marker on the proposed object, and the test that the request has succeeded is made using a constraint. Each time a saccade occurs, the direction of gaze is suitably locked to the proposed object by the firing of a so-called latch licence so that the licence corresponding to the request can be safely deactivated.

A suitable way of providing virtual actors with vision is to render the scene from the point of view of the actor, and then analyze the 2-D image in order to determine the positions of objects in the field of view. This form of synthetic vision can readily be integrated with the mechanism already described for controlling the direction of gaze. Although the result is much slower, a benefit of doing this is that objects in the periphery of the visual field become visible to the actor as a side effect of its directed visual activity, and can provide an additional source of information to the virtual actors component agents. For example, when looking at an object, the object supporting it will normally be in the visual field, hence a component agent interested in how the currently fixated object is supported can request that the direction of gaze be moved to the object below the currently fixated object.

From reading the present disclosure, other modifications will be apparent to persons skilled in the art. Such modifications may involve other features which already known in the field of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed:

1. A rule-based data processing apparatus comprising:
   a processor; and
   memory means coupled with said processor, said memory means having stored therein a first group of agents,
   said first group being defined by a respective set of rules,
   each agent being configured to effect respective designated functions when triggered by a respective predetermined set of conditions holding true and at least some of said agents being configured to trigger others of said agents to effect their respective functions through markers linking respective pairs of agents, each agent including a first decision structure into which respective rules from others of said group of agents may be placed, each decision structure being arranged to periodically select and act on one of the rules placed therein in accordance with predetermined selection criteria, and each agent being configured to place a marker on an agent originating a rule selected by said agent, and to periodically identify one or more other agents of the said group as capable of effecting at least a part of that agents designated function and to place a rule into the first decision structure of the or each agent so identified.

2. Apparatus as claimed in claim 1, wherein each agent includes a second decision structure and is further configured to periodically identify one or more other agents of the said group as having the agents designated function as at least a part of their designated function and to initiate the placing of a rule into the second decision structure of the or each such identified agent.

3. Apparatus as claimed in claim 2, comprising a plurality of further agents stored within said memory means and defined by respective rules, each of said further agents having only a first decision structure.

4. Apparatus as claimed in claim 2, wherein each rule placed in a decision structure has an associated priority value and the periodic selection by said decision structure is of the highest priority from amongst the rules currently placed.

5. Apparatus as claimed in claim 4, wherein each priority value is a time delay, and each decision structure is arranged to periodically synchronously trigger all time delays of rules placed therein, the first rule for which the associated delay expires whilst the condition portion of that rule is satisfied becoming the selected rule.

6. Apparatus as claimed in claim 1, wherein each rule placed in a decision structure has an associated priority value and the periodic selection by said decision structure is of the highest priority from amongst the rules currently placed.

7. Apparatus as claimed in claim 6, wherein each priority value is a time delay, and each decision structure is arranged to periodically synchronously trigger all time delays of rules placed therein, the first rule for which the associated delay expires whilst the condition portion of that rule is satisfied becoming the selected rule.

8. Apparatus as claimed in claim 1, comprising a further group of agents stored within said memory means and being defined by a respective set of rules, at least some of the agents of said further group having first and second decision structures, and at least some agents of each said group being operable to place rules within decision structures of selected agents within the respective other group, and place markers on such selected agents.

* * * * *